May 28, 1929.　　　W. C. DE ROO　　　1,715,321
RADIAL DRILLING MACHINE
Filed Aug. 4, 1924　　　2 Sheets-Sheet 1
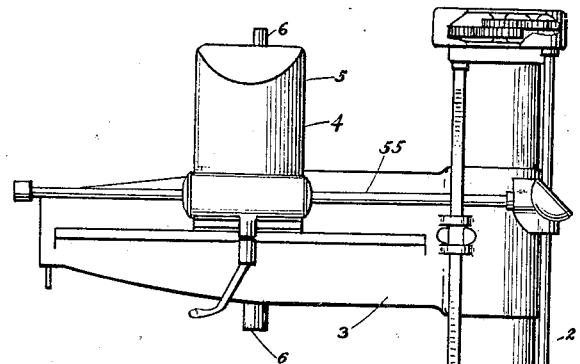
Fig. 1.
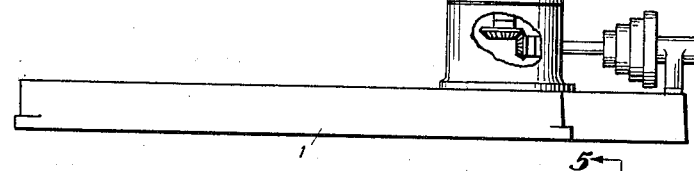
Fig. 3.
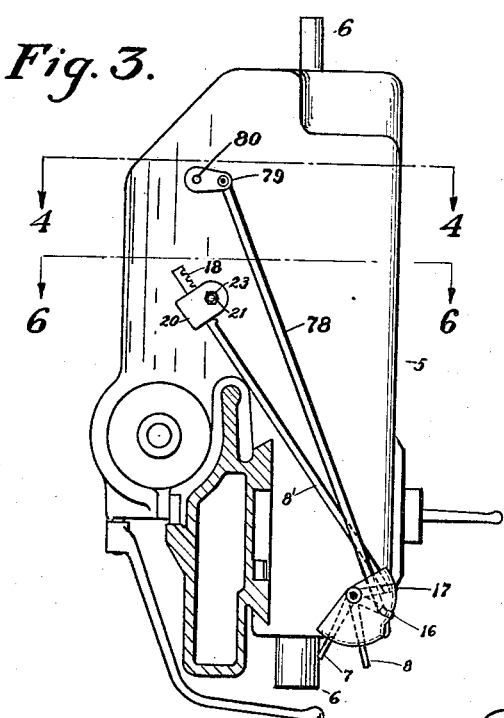
Fig. 2.
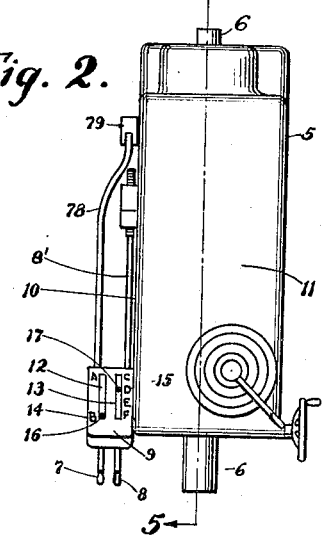
INVENTOR
William C. De Roo.
BY James N. Ramsey
ATTORNEY May 28, 1929.  W. C. DE ROO  1,715,321
RADIAL DRILLING MACHINE
Filed Aug. 4, 1924  2 Sheets-Sheet 2
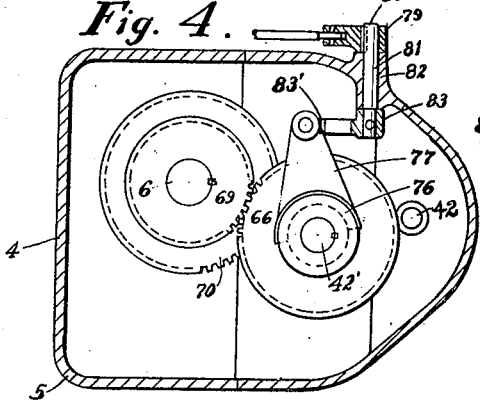
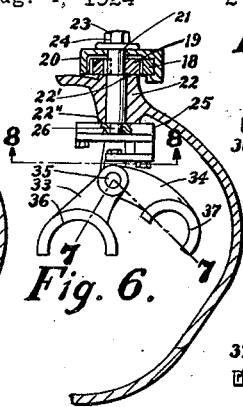
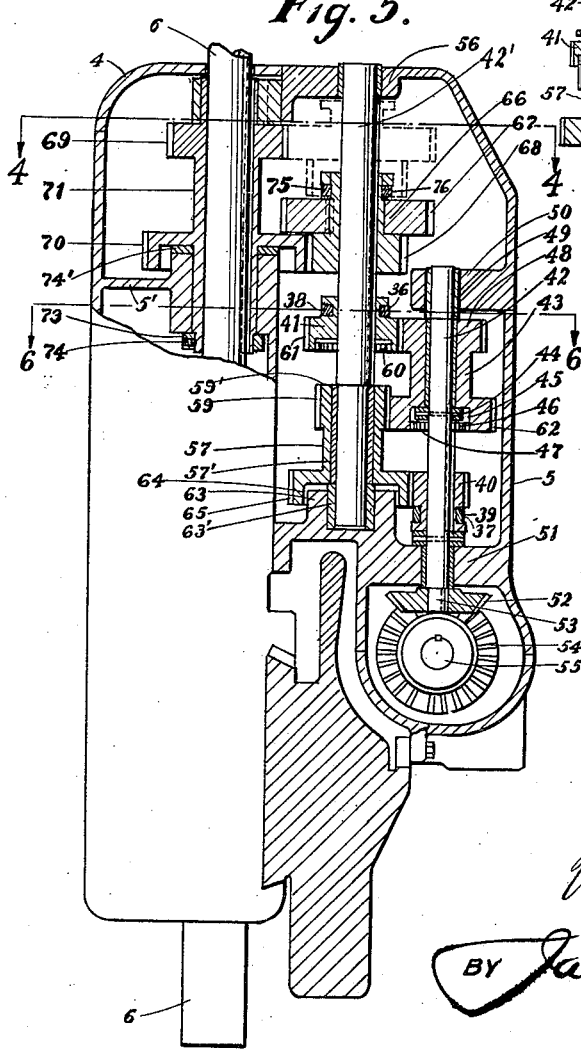
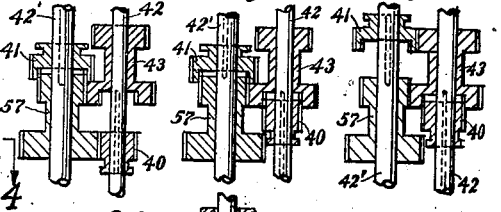
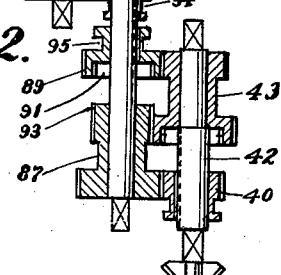
INVENTOR
William C. de Roo.
BY James N. Ramsey
ATTORNEY Patented May 28, 1929.

1,715,321

UNITED STATES PATENT OFFICE.

WILLIAM C. DE ROO, OF CINCINNATI, OHIO, ASSIGNOR TO THE DRESES MACHINE TOOL CO., OF CINCINNATI, OHIO, A CORPORATION OF OHIO.

RADIAL DRILLING MACHINE.

Application filed August 4, 1924. Serial No. 729,952.

My invention particularly relates to mechanism adapted to change the rate of rotatable speed of a drill spindle of a radial drilling machine.

The objects of my invention are to provide compact, efficient and highly desirable means adapted to effectually secure a wide range of various rates of rotatable speed for the drill spindle and in a manner especially designed to avoid undesirable peripheral speeds of the driving gears; to provide a desirable rate of rotatable speed for propelling means; to provide a change speed mechanism adapted to avoid excessive speed of the driving pinions; to provide a graduated succession of change speeds for the drill spindle through gears of small difference in size; to provide efficient gear shifting mechanism; and to provide an assemblage of mechanism simple and durable in construction.

My invention consists in providing a plurality of gears among which are compound external gears and compound external and combination internal gears or clutches and slidable clutch gears arranged in conjunction with one another and adapted to effect a variety of gear ratios between the propelling shaft and the drill spindle by means of manually operatable levers having suitable connection with gear shifting mechanism having operative connection with said gears.

My invention further consists in the combination, location and arrangement of parts, as herein set forth and claimed.

In the drawings:

Fig. 1 is a rear elevation of a radial drill having my invention embodied therein;

Fig. 2 is a front elevation of a radial drilling machine head having my invention embodied therein;

Fig. 3 is a side elevation of the same;

Fig. 4 is a section of the casing taken on a line corresponding to 4—4 in Fig. 3 and Fig. 5;

Fig. 5 is a section taken on a line corresponding to 5—5 in Fig. 2 showing the casing partly broken away;

Fig. 6 is a section of the casing taken on a line corresponding to 6—6 in Fig. 3 and Fig. 5 showing my mechanism for shifting the gears particularly shown in Figs. 9, 10 and 11;

Fig. 7 is a section taken on a line corresponding to 7—7 in Fig. 6 showing the shaft links and forks in side elevation;

Fig. 8 is a side elevation of the gear shifting mechanism taken on a line corresponding to 8—8 in Fig. 6;

Fig. 9 is a part section taken on a line corresponding to 5—5 in Fig. 2 showing my gear mechanism;

Fig. 10 is the same as Fig. 9 showing the gears meshed differently from Figs. 5 and 9.

Fig. 11 is the same as Fig. 9 showing the gears meshed differently from Figs. 5, 9 and 10; and Fig. 12 is a modified form of my gear mechanism.

The preferred construction of my invention is exemplified in a usual radial drilling machine, mainly comprising base 1, column 2, arm 3 and head 4 having well known mechanical connections with one another.

Head 4 to which my invention particularly relates comprises casing 5 having other mechanism herein described in detail for transmitting power from suitable outside source for the purpose of rotating shaft or spindle 6. It is especially advantageous and desirable, for well known reasons, to provide compact mechanism within the head through which considerable variations of rotatable speed of spindle 6 may be accomplished.

In the preferred construction of my invention, I provide levers 7 and 8 pivotally mounted in box 9 fixed to side 10 adjacent front 11 of casing 5 of head 4 (Figs. 2 and 3). Box 9 has parallel spaced apart vertical slots 12 and 13 therein, respectively, having indicia 14 and 15 adjacent thereto for the purpose of conveniently enabling the operator of the radial drilling machine to position the gear shifting mechanism, hereinafter explained, by manually operating levers 7 and 8, respectively, having fingers 16 and 17 fixed thereto. The fingers 16 and 17, respectively, project through slots 12 and 13 whereby the position of the fingers relative to indicia 14 and 15 are the means for indicating the rotary speed of spindle 6.

Connecting rod 8' having its lower end pivotally connected to finger 17 has rack 18 integrally formed at its upper end. Rack 18 is retained in mesh with pinion 19 by guard 20 fixed in engagement with upper side 10 of casing 5. Pinion 19 (Fig. 6) is keyed to shaft 21 rotatably mounted in boss 22 of casing 5 and is retained against inward movement by nut 23 threaded to outer end 24 of the shaft and in engagement with the outer side 22' of boss 22. Triangular eccentric 25 keyed to inner end 26 of shaft 21 bears against the inner side 22'' of boss 22 and has links 27 and 28 pivotally connected to corners 29 and 30, respectively, of eccentric 25. The ends 31 and 32, respectively, of links 27 and 28 are pivotally connected to forks 33 and 34, respectively, which are slidably mounted on shaft 35 (suitably mounted in casing 5) and respectively having curved surfaces 36 and 37, respectively, adapted to fit into circular grooves 38 and 39, respectively, in slidable clutch gears 41 and 40. Gears 40 and 41, are splined to rotatable driving shaft 42 and intermediate shaft 42', respectively, in casing 5 of head 4, as shown in Fig. 5.

Driving shaft 42 also has compound clutch gear 43 rotatably mounted thereon and retained against downward movement by collar 44 fixed to the shaft and in engagement with the lower portion of the gear within recess 45 having clutch or internal teeth 46 therein, whereby clutch 47 is formed and with which clutch gear 40 is adapted to mesh. Compound clutch gear 43 is retained against upward movement by engagement of integral external gear 48 with bushing 49 and fixed in web 50 into which the upper end of driving shaft 42 is journaled. The other end of said shaft is journaled in web 51 of casing 5 and has bevel gear 52 fixed to end 53 of the shaft whereby rotary movement is imparted to the shaft through bevel gear 52 meshing with bevel gear 54 fixed to propelling shaft 55 extending longitudinally of arm 3 and having suitable connection with outside source of power.

Intermediate shaft 42' having its upper and lower ends, respectively, journaled in boss 56 and web 51 of casing 5 has compound clutch gear 57 rotatably mounted at its lower end and retained against upward movement by a shouldered portion of the shaft and engaging clutch teeth 59' formed by gear 59 integral with compound gear 57 adapted to mesh with internal clutch 60 integral with gear 41, whose external gear 61 is adapted to mesh with gear 48 of compound gear 43.

Gear 62 is adapted to mesh with gear 59 integral with compound gear 57 integral with bushing 57' rotatably mounted on intermediate shaft 42' seated on bushing 63' in upwardly extending boss 63 integral with web 51. Boss 63 enters circular recess 64 of gear 65 adapted to mesh with slidable clutch gear 40 splined to driving shaft 42.

Gears 40, 48, 59, 61, 62 and 65 and clutches 47 and 60 of varying sizes are so positioned as to provide a plurality of different rotatable speeds.

Compound gear 66 splined to intermediate shaft 42' is positioned adjacent the top of the shaft and comprises gear 67 and pinion 68, respectively, adapted to mesh respectively with gear 69 and gear 70 comprising compound gear 71 splined to drill spindle 6 rotatably mounted in casing 5 of head 4. Collar 73 fixed to the lower portion of compound gear 71 by screw 74 prevents upward movement of compound gear 71 resting on bearing 74' supported by web 51 extending inwardly from casing 5.

Compound gear 66 has circular groove 75 in its upper portion whereby curved surface 76 of arm 77 is adapted to fit for the purpose of sliding the gear on intermediate shaft 42' by manual operation of lever 7 having connection with connecting rod 78 pivotally connected to crank 79 fixed to protruding end 80 of crank shaft 81 journaled in boss 82 of casing 5 and having one end or center of rockable segment 83 fixed to its inner end. The outer portion of rockable segment 83 meshes with rack 83' integral with fork 77 whereby manual operation of hand lever 7 through the connection just mentioned causes compound gear 66 to slide on intermediate shaft 42' for meshing gear 67 with gear 69 or for meshing pinion 68 with gear 70, as shown in Fig. 5.

It will, therefore, be seen that by the use of my mechanism, a plurality of different rotatable speeds may be imparted to spindle 6 by the various combinations of gear ratios available through gears and clutches 40, 47, 62, 48, 65, 59, 60 and 61 which combinations are available by manual operation of lever 8. Gears 66, 69, 68 and 70 may also be brought into the combination by manual operation of lever 7 whereby eight different rates of rotatable speeds are imparted to spindle 6.

The operation of my mechanism is as follows;

Assume the mechanism is positioned, as shown in Fig. 5. As heretofore explained rotary movement is imparted to driving shaft 42, through propelling shaft 55 and bevel gears 54 and 52.

Assume that change of the rate of rotatable speed of spindle 6 is desired and obtainable through operation of hand lever 8 until finger 17 is positioned adjacent E of indicia 15, and without movement of hand lever 7. It is understood that for each gear ratio accomplished through operation of lever 8 a different gear ratio may be accomplished by operation of hand lever 7.

Positioning finger 17 adjacent E of indicia 15 by operation of hand lever 8 causes the gears to assume a relative position, as shown in Fig. 9, by mechanical operation in detail as follows:

Operation of hand lever 8 pivotally mounted in box 9 causes movement of integral finger 17 having connecting rod 8' fixed thereto whereby rack 18 at the upper end of rod 8', (in mesh with pinion 19 fixed to shaft 21 and enclosed in guard 20 fixed to casing 5 of head 4,) causes rotation of shaft 21 journaled in boss 20 of casing 5 and having triangular eccentric 25 keyed to its inner end 26 whereby motion is imparted to links 27 and 28, respectively, pivotally connected to corners 29 and 30 of the eccentric. Links 27 and 28, respectively, are pivotally connected to forks 33 and 34 slidably mounted on shaft 35 and respectively have surfaces 36 and 37, respectively, fitted into grooves 38 and 39 of slidable clutch gears 41 and 40 which cause gear 61 to slide from mesh with gear 48 whereby clutch gear 41 in sliding downwardly meshes internal gear clutch 60 with external gear clutch 59' integral with gear 59 whereby the relative change of rotary speed of spindle 6 is dependent upon the difference of gear ratio obtained by movement of the gears from the position shown in Fig. 5. Spindle 6 is thereby rotated at a speed dependent upon the gear ratio obtained through bevel gears 54 and 52, gears 40 and 65, clutch gear 59 and internal gear clutch 60 and pinion 68 and gear 70. It is apparent that operation of hand lever 7, whereby pinion 68 is disengaged from mesh with gear 70 and effecting meshing of gear 67 with gear 69, will produce a different rate of rotatable speed of spindle 6, as is the case also when any different combination and arrangement is obtained through gears and clutches 40, 47, 62, 48, 65, 59, 60 and 61.

Meshing disengagement of clutch gear 40 with gear 65 is not effected by operation of hand lever 8 during the last described action, for the reason that movement is imparted to corner 30 of the eccentric 25 by link 28 to a point opposite from the position, as shown in Fig. 8, and in the same relative plane whereby, although during the operation of hand lever 8 link 28 causes gear 40 to move downwardly during a portion of the circular movement of corner 30 of the eccentric and the mechanical arrangement is such that when finger 17 is directly opposite E of indicia 15, corner 30 of the eccentric has risen the same distance from the bottommost portion of the curved movement as the distance is from corner 30 to the bottom of the curve, whereby gear 40 assumes its identical position when finger 17 is adjacent E as when adjacent D of indicia 15.

Now assume that it is desired to accomplish a gear ratio through the various gears obtainable by positioning finger 17 adjacent F of indicia 15 which gear ratio is accomplished through intermeshing of gears, as shown in Fig. 10. Hand lever 8 is manually operated until finger 17 is positioned adjacent F whereby through connecting rod 8', rack 18, pinion 19, shaft 21, eccentric 25, links 27 and 28, arms 33 and 34, the slidable clutch gears 41 and 40, respectively, are caused to slide on vertical intermediate shaft 42' and driving shaft 42, whereby gear 40 is caused to slide upwardly from mesh with gear 65, and into mesh with internal gear clutch 47, and whereby the relative change of rotary speed of spindle 6 is accomplished. There is no variation of gear ratios obtained through clutches 59' and 60 by operation of lever 8 during the last described actuation thereof, for the reason that movement is imparted to corner 29 of eccentric 25 to a point opposite its previous position occupied when the gears were meshed, as shown in Fig. 9, whereby clutch 59' remains in the same relation with clutch 60 as when finger 17 indicates E or F of indicia 15. The rotary speed of spindle 6, through the combination thus accomplished, is dependent upon the initial rotary speed of propelling shaft 55, gear ratio of bevel gears 54 and 52, the gear ratio obtained through meshed gears 62 and 59, and the gear ratio obtained through pinion 68 meshed with gear 70.

The arrangement of mechanism as just explained and shown in Fig. 10 is obtained by setting hand levers 7 and 8, at B and F, respectively.

Movement of hand lever 8 for positioning finger 17 from F to C of indicia 15 causes rod 8' to impart movement to rack 18 actuating gear 19, shaft 21, eccentric 25, links 27 and 28, forks 36 and 37 and splined clutch gears 41 and 40. During this operation the gears are moved from the position shown in Fig. 10 to the position shown in Fig. 9, and then to the position shown in Fig. 5 and then to the final position shown in Fig. 11, in which splined clutch gear 40 meshes with clutch teeth 46 integral with gear 43, thereby imparting motion to gear 48 which in turn is meshed with splined clutch gear 41 splined to intermediate shaft 42' and power is transmitted to spindle 6 through either pinion 68 and gear 70, or gears 67 and 69, dependent upon the position of hand lever 7.

The various combinations of gears and gear ratios obtainable through operation of hand levers 7 and 8 are accomplished through the various gears and clutches capable of intermeshing and effect eight different rates of rotary speed of spindle 6, two of which are accomplished through the meshing of pinion 68 with gear 70 and meshing of gear 67 with gear 69 obtainable through operation of hand lever 7 and four of which are accomplished by the various meshing of gears 40, 48, 59, 61, 62 and 64 and clutch gears 47 and 60 obtainable through operation of hand lever 8. Hand levers 7 and 8 are distinctly separate from each other in mechanical connection and may be operated independently of each other.

In Fig. 12 I show a modified form of construction, by which the principle of my invention may be incorporated into mechanism and gear shifting mechanism adapted to provide a greater number of definite speeds of spindle 6, than may be accomplished by the mechanism heretofore explained. I accomplish additional speeds by the use of an additional intermediate shaft 85 having compound external gear and internal clutch gear 86 and compound external gear and external clutch 87 rotatably mounted and respectively positioned adjacent the top and bottom of shaft 85. Splined combination external gear and external clutch gear 88 and combination external gear and internal clutch gear 89 are mounted intermediate gears 86 and 87 on shaft 85. Gears 88 and 89 are splined on shaft 85 for the purpose of being actuated into and out of meshing engagement with compound clutch gear 57 and compound gear and clutch 43, respectively, rotatably mounted on intermediate shaft 42′ and driving shaft 42, and for obtaining other gear connections. Gears 88 and 89, respectively, have integral external and internal clutch gears 90 and 91, respectively, adapted to mesh with internal and external clutches 92 and 93, respectively, of gears 86 and 87. Circular grooves 94 and 95, respectively, of gears 88 and 89 are adapted to receive arms (not shown) similar in construction to arms 33 and 34 and having suitable connections with hand lever 8, or if desired, a separate hand lever may be provided to actuate gears 88 and 89.

In Fig. 12 I show one arrangement of meshing the various gears and clutches comprising the gear shifting mechanism having intermediate shaft 85 suitably positioned relative to intermediate shaft 42 and driving shaft 42′. The gears 86, 87, 88 and 89 mounted on shaft 85 are adapted to be meshed in combination with the various gears heretofore described and mounted on driving shaft 42 and intermediate shaft 42′ for the purpose of obtaining a greater number of different rotatable speeds of spindle 6.

While I have chosen to illustrate the form and construction of my invention by the herein drawings and explanations of the same, I desire to state that I have not intended to include all of the various forms of modification in which my invention may be incorporated. The illustrations and explanations herein are made merely for the purpose of showing preferred forms of construction by which my invention may be carried into effect.

My invention resides in the combination and arrangement of parts and in the details of construction, as hereinafter claimed, it being understood that changes in the precise embodiment of the invention herein disclosed can be made within the scope of what is claimed without departing from the spirit of the invention.

What I claim as new and desire to secure by Letters Patent is:

1. In a radial drilling machine, the combination of a drill spindle and gear mechanism, a plurality of shafts, a plurality of sets of gears and clutches mounted on said shafts and spindle, including a compound gear having clutch teeth thereon and rotatably mounted on one of said shafts, a splined combination external gear and clutch mounted adjacent said compound gear and adapted to mesh therewith, a compound gear having an internal clutch and rotatably mounted on another of said shafts, said first compound gear adapted to mesh with said second compound gear and manually operative means adapted to actuate said combination external gear and clutch into mesh with said compound gears, whereby a variety of gear ratios are imparted to said drill spindle.

2. In a radial drilling machine, the combination of a drill spindle shaft and gear mechanism comprising a driving shaft, an intermediate shaft, gear connection between said drill spindle shaft and said intermediate shaft, a plurality of sets of gears and clutches mounted on said shafts and comprising a splined combination external gear and clutch mounted on said intermediate shaft, a compound gear rotatably mounted on said intermediate shaft and having a clutch on one end thereof, a splined external gear mounted on said driving shaft, a compound gear having a clutch thereon and rotatably mounted on said driving shaft, an external gear on said first compound gear in continuous mesh with said second compound gear and manually operative double means adapted to actuate each of said splined combination external gears and clutches.

3. In a radial drilling machine, the combination of a drill spindle shaft and gear mechanism comprising a driving shaft, an intermediate shaft, gear connection between said drill spindle shaft and said intermediate shaft, a plurality of sets of gears and clutches mounted on said shafts and comprising a splined combination external gear and clutch mounted on said intermediate shaft, a compound gear rotatably mounted on said intermediate shaft and having a clutch on one end thereof, a splined external gear having a clutch on one end thereof mounted on said driving shaft, a compound gear having a clutch thereon and rotatably mounted on said driving shaft, an external gear on said first compound gear in mesh with said second compound gear and manually operative double means adapted to actuate each of said splined combination external gears and clutches.

4. In a radial drilling machine, the combination of a drill spindle shaft and gear mechanism comprising a driving shaft, an intermediate shaft, gear connection between said drill spindle shaft and said intermediate shaft, a plurality of sets of gears and clutches mounted on said shafts and comprising a splined combination external gear and clutch mounted on said intermediate shaft, a compound gear rotatably mounted on said intermediate shaft and having a clutch on one end thereof, a splined external gear mounted on said driving shaft, a compound gear having a clutch thereon and rotatably mounted on said driving shaft, an external gear on said first compound gear in mesh with said second compound gear and manually operative means adapted to actuate each of said splined combination external gears and clutches.

5. In a radial drilling machine, a head, a spindle shaft, an intermediate shaft and a driving shaft rotatably mounted in said head, gear connections between said spindle shaft and said intermediate shaft, a combination external gear and clutch splined to said intermediate shaft and having said clutch at the lower end thereof, a compound external gear rotatably and non-slidably mounted below said combination external gear and clutch on said intermediate shaft and having clutch teeth at the upper end thereof adapted to mesh with said clutch, a combination external gear and clutch gear rotatably mounted on said driving shaft, an external gear splined longitudinally on said driving shaft below said driving shaft combination-external-gear-and-clutch and having clutch teeth at the upper end thereof adapted to mesh with said driving shaft clutch, and manually operative means adapted to mesh said gears and clutches with one another, substantially as described.

6. In a radial drilling machine, a head, a spindle shaft, an intermediate shaft and a driving shaft rotatably mounted in said head, gear connections between said spindle shaft and said intermediate shaft, a combination external gear and clutch splined to said intermediate shaft and having said clutch at the lower end thereof, a compound external gear rotatably and non-slidably mounted on said intermediate shaft and having clutch teeth at the upper end thereof adapted to mesh with said clutch, a combination external gear and clutch gear rotatably mounted on said driving shaft, a compound external gear splined on said driving shaft and having clutch teeth at the lower end thereof adapted to separately mesh with said driving-shaft-clutch gear, and meshing with said intermediate shaft compound gear, and manually operative means adapted to mesh said gears and clutches with one another, substantially as described.

7. In a radial drilling machine head, a spindle, an intermediate shaft and a driving shaft rotatably mounted in said head, a combination external gear and clutch splined to said intermediate shaft and having said clutch at the lower part of said gear, a compound external gear rotatably and non-slidably mounted on said intermediate shaft below said combination external and clutch gear and having clutch teeth at the upper end thereof adapted to mesh with said clutch, a compound external gear and clutch rotatably and non-slidably mounted on said driving shaft, an external gear splined on said driving shaft below said compound external gear and clutch gear mounted on said driving shaft, said external gear of said driving shaft having a clutch at its upper end adapted to mesh with said clutch on said driving-shaft-compound-external-gear-and-clutch-gear, said intermediate-shaft-compound-external-gear-and-clutch-gear adapted to mesh with said driving-shaft-compound-external-gear-and-clutch gear and said driving-shaft-external gear, respectively, manually operative means adapted to mesh said gears and clutches, substantially as described, whereby various rates of rotatable speed are imparted to said intermediate shaft by said driving shaft and gear connection between said intermediate shaft and said spindle shaft whereby various rates of rotatable speed relative to said intermediate shaft are adapted to be transmitted from said intermediate shaft to said spindle shaft, whereby a number of speeds is adapted to be imparted to said spindle shaft dependent upon the number of different speeds accomplished through said gear connection between said intermediate shaft and said spindle shaft times the number of different speeds obtained through said gear and clutch connections between said driving shaft and said intermediate shaft.

8. In a radial drilling machine head, a spindle, an intermediate shaft and a driving shaft rotatably mounted in said head, a combination external gear and clutch splined to said intermediate shaft, a compound external gear rotatably and non-slidably mounted on said intermediate shaft and having clutch teeth adapted to mesh with said clutch, a compound external gear and clutch rotatably and non-slidably mounted on said driving shaft, an external gear splined on said driving shaft, said external gear of said driving shaft having a clutch at its upper end adapted to mesh with said clutch on said driving-shaft-compound-external-gear-and-clutch-gear, said intermediate shaft-compound-external-gear-and clutch-gear adapted to mesh with said driving-shaft-compound external-gear-and-clutch-gear and said driving shaft external gear, respectively, manually operative means adapted to mesh said gears and clutches, substantially as described, whereby various rates of rotatable speeds are imparted to said intermediate shaft by said driving shaft and gear connection between said intermediate shaft and said spindle shaft whereby various rates of rotatable speed relative to said intermediate shaft are adapted to be transmitted from said intermediate shaft to said spindle shaft, whereby a number of speeds is adapted to be imparted to said spindle shaft dependent upon the number of different speeds accomplished through said gear connection between said intermediate shaft and said spindle shaft times the number of different speeds obtained through said gear and clutch connections between said driving shaft and said intermediate shaft.

9. In a radial drilling machine, a head, a spindle mounted adjacent thereto, an intermediate shaft and a driving shaft rotatably mounted in said head and having gear connections with said spindle, a compound external and combination clutch gear mounted on said driving shaft, a pair of external gears having clutch teeth and mounted on said driving shaft and said intermediate shaft, respectively, a manually operative hand lever pivotally mounted to said head, a connecting rod fixed to said lever and having a rack at one end thereof, and gear shifting mechanism actuated by said rack whereby said pair of external gears having clutch teeth are adapted to be successively meshed with respective gears.

10. In a radial drilling machine, a head, a spindle mounted adjacent thereto, an intermediate shaft and a driving shaft rotatably mounted in said head and having gear and clutch connections with said spindle, a compound external and combination clutch gear mounted on said driving shaft, a pair of external gears having clutch teeth mounted on said driving shaft and said intermediate shaft, respectively, a manually operative hand lever pivotally mounted to said head, a connecting rod fixed to said lever, and gear shifting mechanism whereby said pair of external gears having clutch teeth are adapted to be successively meshed with said gear and clutch connections.

11. In a radial drilling machine, a head, a spindle shaft rotatably mounted in said head, a compound external gear keyed to said spindle shaft, an intermediate shaft rotatably mounted adjacent said spindle shaft and parallel thereto, a compound external gear splined to said intermediate shaft and adapted to mesh with said spindle shaft-compound-gear and having a circular recess therein, a combination external gear and clutch having a circular groove therein splined to said intermediate shaft, a compound external gear having clutch teeth and rotatably mounted on said intermediate shaft beneath said combination external gear and clutch, a driving shaft rotatably mounted in said head, a compound external gear and clutch gear rotatably mounted on said driving shaft and in mesh with said intermediate shaft compound gear, a combination external gear and clutch splined to said driving shaft and having a circular groove therein, a manually operative hand lever, a connecting rod connected thereto and having a rack integral therewith, eccentric gear shifting mechanism actuated by said rack and engaging said combination external and clutch gears in said circular grooves, respectively, a second manually operative hand lever, a connecting rod connected thereto, a rockable arm rotatably mounted in said head and fixed to said last connecting rod, and gear shifting mechanism connected to said rockable arm and adapted to engage said circular recess in said intermediate shaft-compound-external-gear, substantially as and for the purposes specified.

12. In a radial drilling machine, a head, a spindle rotatably mounted therein, an intermediate shaft and a driving shaft rotatably mounted in said head and having gear connection with said spindle, a pair of external gears having clutch teeth at one end thereof and each having a circular groove therein and splined to said shafts, respectively, a pair of compound external gears having clutch teeth and rotatably mounted on said shafts, respectively, and adapted to cooperate with said external gears, respectively, a manually operative hand lever pivotally mounted on said head, a connecting rod connected to said lever and having a rack integral therewith, gear shifting mechanism actuated by said rack, and forks connected with said gear shifting mechanism and adapted to fit in said grooves, respectively, whereby said external gears having clutch teeth are adapted to be successively actuated into and out of mesh with said compound gears.

13. In a radial drilling machine, a head, a spindle shaft rotatably mounted in said head, a compound external gear splined to said spindle shaft, an intermediate shaft rotatably mounted adjacent said spindle shaft and parallel thereto, a compound external gear splined to said intermediate shaft and adapted to mesh with said spindle-shaft-compound-gear and having a circular recess therein, a combination external gear and clutch having a circular groove therein splined to said intermediate shaft, a compound external gear having clutch teeth and rotatably mounted on said intermediate shaft and adapted to mesh with said intermediate shaft combination external gear and clutch, a driving shaft rotatably mounted in said head, a compound external gear and clutch gear rotatably mounted on said driving shaft, a combination external gear and clutch splined to said driving shaft and having a circular groove therein, a manually operative hand lever, a connecting rod connected thereto and having a rack integral therewith, gear shifting mechanism actuated by said rack and engaging said combination external and clutch gears in said circular grooves, respectively, a second manually operative hand lever, a connecting rod connected thereto, a rockable arm rotatably mounted in said head and fixed to said last connecting rod, and gear shifting mechanism connected to said rockable arm and adapted to engage said circular recess in said intermediate-shaft-compound-external-gear, substantially as and for the purposes specified.

14. In a radial drilling machine, a head, a spindle shaft rotatably mounted in said head, a compound external gear splined to said spindle shaft, an intermediate shaft rotatably mounted adjacent said spindle shaft and parallel thereto, a compound external gear splined to said intermediate shaft and adapted to mesh with said spindle-shaft-compound-gear and having a circular recess therein, a combination external gear and clutch having a circular groove therein splined to said intermediate shaft, a compound external gear having clutch teeth and rotatably mounted on said intermediate shaft, a driving shaft rotatably mounted in said head, a compound external gear and clutch gear rotatably mounted on said driving shaft and meshing with said intermediate shaft compound gear, a combination external gear and clutch splined to said driving shaft and having a circular groove therein, a manually operative hand lever, a connecting rod connected thereto and having a rack integral therewith, and gear shifting mechanism actuated by said rack and engaging said combination external and clutch gears in said circular grooves, respectively, substantially as and for the purposes specified.

15. In a radial drilling machine, a head, a spindle shaft rotatably mounted in said head, a compound external gear keyed to said spindle shaft, an intermediate shaft rotatably mounted adjacent said spindle shaft and parallel thereto, a compound external gear splined to said intermediate shaft and adapted to mesh with said spindle-shaft-compound-gear and having a circular recess therein, a combination external gear and clutch having a circular groove therein splined to said intermediate shaft, a compound external gear having clutch teeth and rotatably mounted on said intermediate shaft beneath said combination external gear and clutch, a driving shaft rotatably mounted in said head, a compound external gear and clutch gear rotatably mounted on said driving shaft, a combination external gear and clutch splined to said driving shaft and meshing with said intermediate shaft compound gear, and having a circular groove therein, and operative means engaging said combination external and clutch gears in said circular grooves, respectively, substantially as and for the purposes specified.

16. In a radial drilling machine, a head, a spindle shaft rotatably mounted in said head, a compound external gear keyed to said spindle shaft, an intermediate shaft rotatably mounted adjacent said spindle shaft and parallel thereto, a compound external gear splined to said intermediate shaft and adapted to mesh with said spindle-shaft-compound-gear and having a circular recess therein, a combination external gear and clutch having a circular groove therein splined to said intermediate shaft, a compound external gear having clutch teeth and rotatably mounted on said intermediate shaft beneath said combination external gear and clutch, a driving shaft rotatably mounted in said head, a compound external gear and clutch gear rotatably mounted on said driving shaft, a combination external gear and clutch splined to said driving shaft and meshing with said intermediate shaft compound gear, and having a circular groove therein, a manually operative hand lever, a connecting rod connected thereto and having a rack integral therewith, and gear shifting mechanism actuated by said rack and engaging said combination external and clutch gears in said circular grooves, respectively, substantially as and for the purposes specified.

17. In a radial drilling machine head, drill spindle gear mechanism comprising a main driving shaft, a drill spindle and an intermediate shaft, spindle speed change mechanism between said main driving shaft and said drill spindle consisting of a combination-compound-external-gear and integral clutch gear rotatably mounted on said driving shaft, a combination-compound-external-gear and integral clutch gear rotatably mounted on said intermediate shaft and adapted to permanently mesh with said driving-shaft-combination compound-external-gear and integral clutch gear, a combination external gear and clutch splined to said driving shaft and adapted to mesh with said intermediate - shaft - combination - compound-external-gear and clutch gear and adapted to clutch said driving shaft combination-compound-external-gear and clutch gear, a combination external gear and clutch splined to said intermediate shaft and adapted to mesh with said driving-shaft-combination-compound-external-gear and clutch gear and adapted to clutch said intermediate-shaft - combination - compound - external - gear and clutch gear, gear connections between said drill spindle and said intermediate shaft, and manually operative gear shifting mechanism.

18. In a radial drilling machine head, drill spindle gear mechanism comprising a main driving shaft, a drill spindle and an intermediate shaft, spindle speed change gear mechanism between said intermediate shaft and said drill spindle, a combination-compound-external-gear and clutch gear rotatably mounted on said driving shaft, a combination compound-external gear and clutch gear rotatably mounted on said intermediate shaft and adapted to permanently mesh with said driving shaft combination compound external gear and clutch gear, a combination gear and clutch splined to said driving shaft and adapted to mesh with said intermediate shaft-combination-compound-external-gear and clutch gear and said driving-shaft-combination-compound-external-clutch-gear, respectively, a combination gear and clutch splined to said intermediate shaft and adapted to mesh with said driving shaft combination compound external gear and clutch gear and with said intermediate shaft combination compound external gear and clutch gear, respectively, and gear shifting mechanism comprising a pair of manually operative hand levers pivotally mounted on said head, one of said hand levers having means whereby a plurality of said gears are successively meshed and the other of said levers having operative connection with said spindle speed change gear mechanism.

19. In a radial drilling machine, a head having indicia printed thereon, drill spindle gear shifting mechanism comprising a manually operative hand lever and having fingers fixed thereto adapted to indicate said indicia, a connecting rod having its lower end pivotally connected to said lever, a rockable lever pivotally connected to the upper end of said connecting rod, a rockable shaft journaled in said head and fixed to said rockable lever, a segment keyed to said rockable shaft, a fork slidably mounted in said head and having rack connection with said segment and adapted to engage one of said gears, a second manually operative hand lever pivotally mounted in said head, a connecting rod fixed to said second lever and having a rack integral at one end thereof, and a gear shifting mechanism actuated by said last rack whereby a pair of gears are adapted to be successively actuated.

20. In a drilling machine head, drill spindle gear shifting mechanism comprising a manually operative hand lever pivotally mounted on said head, a connecting rod connected to said lever and having a rack integral therewith, gear shifting mechanism actuated by said rack and links connected with said gear shifting mechanism whereby a plurality of said gears are adapted to be simultaneously shifted by a single operation of said hand lever.

21. In a radial drilling machine, a head having indicia imprinted thereon, a drill spindle and a plurality of shafts mounted in said head, interengageable gears and clutches mounted on said spindle and shaft and some of which are slidable, an operative hand lever having a finger fixed thereto and adapted to indicate said indicia, a connecting rod pivotally connected to said lever, a rockable lever pivotally connected to said connecting rod, a rockable shaft journaled in said head and fixed to said rockable lever, a segment keyed to said rockable shaft, a fork slidably mounted in said head and having rack connection with said segment and having connection with one of said slidable gears and clutches, whereby it is adapted to be meshed with a gear and clutch on one of said shafts, actuating means connected with the remaining slidable gears and manually operative means connected to said actuating means adapted to mesh said gears and clutches with one another.

22. In a radial drilling machine, a head having indicia imprinted thereon, a drill spindle and a plurality of shafts mounted in said head, interengageable gears mounted on said spindle and shafts some of which are slidable, a pair of operative hand levers, respectively, having fingers fixed thereto and adapted to indicate said indicia, actuating means having connection with one of said slidable gears whereby it is adapted to be meshed with one of said spindle gears and said actuating means having connection with one of said hand levers, other actuating means having connection with the other of said hand levers and having connection with one of said slidable gears whereby it is adapted to be meshed with a gear on one of said shafts, and other actuating means connected with the remaining slidable gear and having connection with said last hand lever.

WILLIAM C. DE ROO.